United States Patent [19]

Sugiura

[11] Patent Number: 4,915,465
[45] Date of Patent: Apr. 10, 1990

[54] LASER BEAM PRINTER USING ONLY ONE SIDE SURFACE OF A ROTATIONAL MIRROR TO SCANNINGLY DEFLECT A SUBSTANTIALLY PERPENDICULAR LASER BEAM

[75] Inventor: Yoshinori Sugiura, Kawasaki, Japan

[73] Assignee: Canon Kabushiki Kaisha, Tokyo, Japan

[21] Appl. No.: 149,020

[22] Filed: Jan. 27, 1988

[30] Foreign Application Priority Data

| Jan. 30, 1987 | [JP] | Japan | 62-019915 |
| Apr. 28, 1987 | [JP] | Japan | 62-107002 |
| Jun. 30, 1987 | [JP] | Japan | 62-101356 |
| Oct. 8, 1987 | [JP] | Japan | 62-255992 |

[51] Int. Cl.$^4$ ............................................. G02B 26/10
[52] U.S. Cl. ..................................... 350/6.5; 350/6.8; 350/6.91
[58] Field of Search ............... 350/6.8, 6.7, 6.5, 6.91; 250/236; 358/285, 293, 296, 206, 497; 346/108

[56] References Cited

U.S. PATENT DOCUMENTS

| 3,800,080 | 3/1974 | Fuwa | 178/7.1 |
| 3,818,444 | 6/1974 | Connell | 350/6.8 |
| 4,475,787 | 10/1984 | Starkweather | 350/6.5 |
| 4,786,919 | 11/1988 | Bidner et al. | 346/108 |

FOREIGN PATENT DOCUMENTS

| 3126642 | 6/1982 | Fed. Rep. of Germany. | |
| 3047813 | 7/1982 | Fed. Rep. of Germany. | |
| 1376074 | 9/1964 | France | 250/236 |
| 108820 | 7/1982 | Japan | 350/6.5 |
| 847267 | 9/1960 | United Kingdom | 350/6.8 |

Primary Examiner—Jon W. Henry
Attorney, Agent, or Firm—Fitzpatrick Cella Harper & Scinto

[57] ABSTRACT

A beam deflecting device for scanningly deflecting a beam, comprising a rotational mirror for reflecting the light beam, the rotational mirror having two opposite side surfaces effective to reflect the beam, wherein only the two surfaces are used for scanningly deflecting the beam, and a driver for rotating the rotational mirror in one direction to scanningly deflect the beam. The rotational mirror may have one side surface effective to reflect the beam, wherein only the one surface is used for scanningly deflecting the beam. The rotational mirror has a non-use portion not used for scanningly deflecting the beam, the non-use portion being provided with at least one groove.

6 Claims, 6 Drawing Sheets

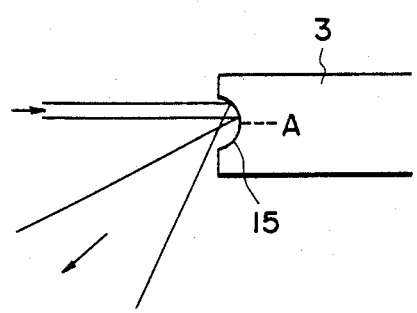
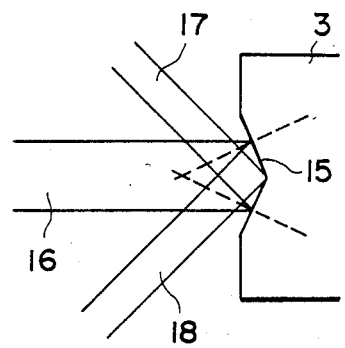
FIG. 15    FIG. 16
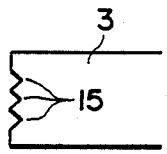
FIG. 17
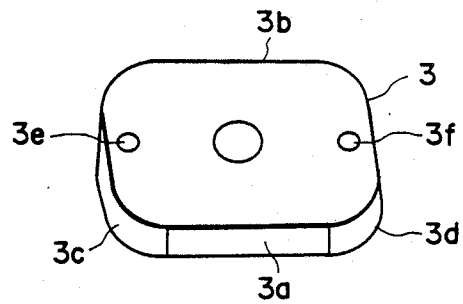
FIG. 18
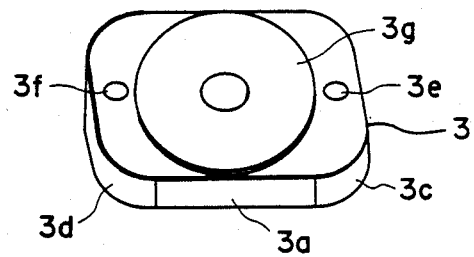
FIG. 19

LASER BEAM PRINTER USING ONLY ONE SIDE SURFACE OF A ROTATIONAL MIRROR TO SCANNINGLY DEFLECT A SUBSTANTIALLY PERPENDICULAR LASER BEAM

FIELD OF THE INVENTION AND RELATED ART

The present invention relates to a beam deflector usable with a bar code reader in which a bar code is scanned by a light beam, usable with a laser beam printer or usable with a laser beam aligner or the like, and more particularly to a laser beam printer using the beam deflector.

It is conventional that a laser beam is scanningly deflected by rotating a mirror. As for the mirrors for this purpose, there are a flat mirror which reciprocates, such as a galvano mirror and a rotational polygonal mirror.

The flat mirror type is not suitable for a high speed rotation because the moment required for the rotation is greatly different, and because a moment of inertia is low, with the result that the balance thereof is not satisfactory. Therefore, a rotational polygonal mirror which is rotated at a constant speed in one direction is widely used because it has a thick side which is formed into mirror surfaces so that the moment of inertia is sufficiently large, and in addition, the moment is substantially balanced. This type of rotational polygonal mirror can be rotated at a high speed, and therefore, is suitable for a practical scanning optical system.

Although the rotational polygonal mirror has the above described advantages, it still involves the following drawbacks.

If the reflecting surface of the rotational polygon mirror is inclined with respect to the direction of the incident beam (tilting), the spacings rotational polygon mirror in such an accuracy as to practically remove the tilting, and therefore, in order to avoid this drawback, it is required to provide an expensive tilt correction optical system.

Referring to FIG. 11 which shows an example of prior art, a rotational hexagon mirror having six reflecting surfaces is rotating to scanningly deflect the beam. The mirror surfaces are slightly tilted, so that the pitches of the scanning lines are not uniform on an unshown photosensitive drum surface on which the beam is incident and which is rotated at a constant speed. The polygon mirror 10 is mounted to the motor flange 11, and the motor rotational shaft 12 and the flange 11 supporting the polygon mirror 10 are slightly oblique to form an angle a seconds due to a mechanical inaccuracy. The beam deflected by the surface 10a is tilted by 2a seconds. As to the adjacent reflecting surface, the tilting is different. When the motor 13 rotates the mirror 10 through 180 degrees, wherein the opposite reflecting surface 10b receives the beam, the tilting of this mirror surface is −a seconds in the direction opposite to that of the first surface. As a result, the tilting of the reflected beam is −2a seconds. Therefore, when the motor rotates the mirror 10 through one full turn, the reflected beam varies within ±2a seconds. Due to this, the pitches between scanning lines are varied.

In addition, when six reflecting surfaces are formed, it is difficult to make the angles of the whole reflecting surfaces with respect to a beam all the same. Therefore, even if the polygonal mirror 10 were mounted without tilting, it would be difficult to present the non-uniform pitch.

For those reasons, it is usual to employ an expensive tilt correcting optical system.

SUMMARY OF THE INVENTION

Accordingly, it is a principal object of the present invention to provide a beam deflecting device which has the advantages of the polygonal mirror, and which is substantially free from influence of tilting.

It is another object of the present invention to provide a beam deflector in which when a light beam is incident on such a surface of a mirror as is not used for the beam deflection, the scanning is not adversely affected.

It is a further object of the present invention to provide a beam deflecting device which is suitably usable with a laser beam printer, by which the pitches of the scanning lines are uniform.

It is a yet further object of the present invention to provide a small-size deflector. According to an embodiment, only one or two reflecting surfaces are used for scanningly deflecting a beam, so that the size of the deflector can has reduced.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 15, 16, 17, 18 and 19 are sectional views according to other embodiments of the present invention.

DESCRIPTION OF THE PREFERRED EMBODIMENTS

Figure 1:
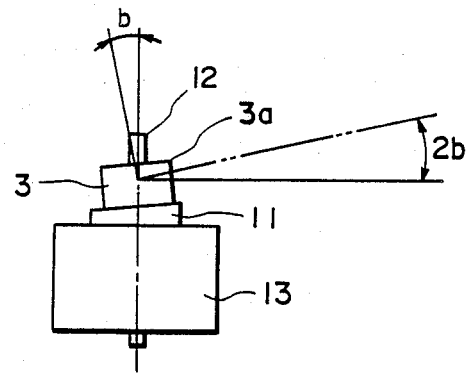
FIGS. 1 and 3 are side and perspective views of a beam deflector according to an embodiment of the present invention.

Referring to Figures, preferred embodiments of the present invention will be described wherein the same reference numerals are assigned to the corresponding elements.

Figure 10A:
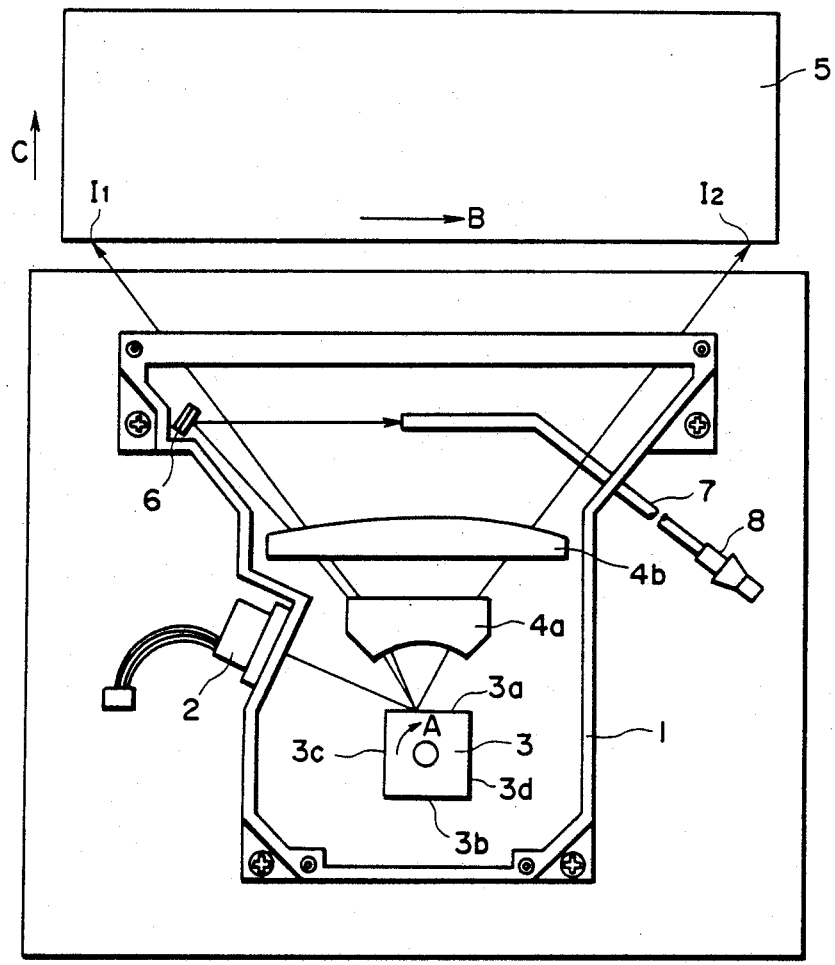
FIGS. 10A and 10B are a top plan view and a schematic sectional view of a laser beam printer according to an embodiment of the present invention.

Referring first to FIG. 10A, there is shown a laser beam printer incorporating a light deflecting device according to an embodiment of the present invention.

The laser beam printer comprises a molded housing 1, a semiconductor laser source 2 mounted on a side wall of the housing 1, a rotational mirror 3 rotatable in a direction indicated by an arrow A in the housing 1, an f-θ lens system 4a and 4b a mirror 6 and a fiber 7.

A laser beam is emitted from the laser source 2 and is modulated in accordance with information to be recorded, and is scanningly deflected by rotation of the rotational mirror 3 in a main scanning direction (direction B). Also, it is scanned in a subordinate scanning direction (direction C), that is, the direction of movement of the photosensitive member 5.

A light sensor 8 receives the laser beam at a predetermined position outside an effective scanning range (between I1 and I2) of the photosensitive member. The light sensor 8 produces a synchronizing signal, in response to which the start of modulation of the laser beam starts.

Figure 10B:
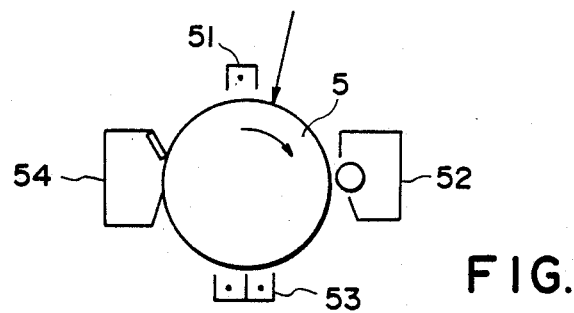
Figure 11:
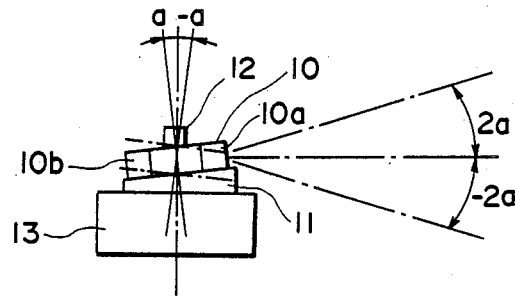
FIG. 11 is a sectional view of a conventional beam deflector.

As shown in FIG. 10B around the photosensitive drum 5, there are disposed process means such as a charger 51, a developing device 52, a transfer device 53, a cleaning device 54 and the like.

In this embodiment, no particular tilt correcting optical system is used, such as a cylindrical lens or the like.

Figure 2:
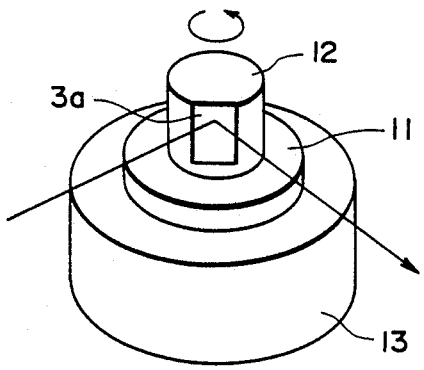
FIG. 2 is a perspective view of a beam deflector according to another embodiment of the present invention.

Referring to FIGS. 1 and 2 showing an embodiment of the present invention, the rotational mirror 3 has the advantage of a rotational polygon mirror, that is, it includes a cylindrical or columner metal having a substantial thickness, more particularly, it is a circular rod of non iron metal, a part of the peripheral of which 3a is machined to a flat surface, which constitute a reflecting surface. By this, a large moment of inertia can be provided to stabilize the rotation, which is suitable for a high speed rotation. Assuming that the mirror surface is inclined by b seconds with respect to a rotational axis of the motor 13, the reflected beam is inclined by 2b for the reason described hereinbefore. However, the rotor has only one mirror surface, so when the beam is reflected by the mirror surface after one full turn of the rotor, the inclination of the reflected beam is also 2b.

This is particularly effective when the photosensitive member is line-scanned. This is because it has only one reflecting surface, so that the tilting, if any, is the same whenever the photosensitive member is scanned, whereby the pitches of the scanning lines are constant. Therefore, the image deterioration by the tilting can be avoided without the necessity of using a special tilt correction optical system. Thus, the size o the device and the cost thereof can be reduced. In this embodiment, during the time when the beam is incident on the non-mirror surface of the rotor, the beam may be emitted. However, it is preferable to stop the beam because there is a liability that a beam reflected thereby reaches the photosensitive member to unintentionally expose it.

Since it has one mirror surface, the rotational mirror is preferably rotated at a high speed, and therefore, the rotational mirror is not made of glass but made of a metal, particularly a non-iron metal.

Further, when the rotor is formed by partly cutting a circular rod or column on a thick circular disk, rotational balance is slightly disturbed. Therefore, it is preferable that a weight is provided to the cut-away side, or the opposite side is also cutaway to provide a balance.

As an alternative, a rotational polygonal mirror may be used, but wherein only one predetermined surface is used for scanning the beam by controlling the laser emitting timing.

At this time, the laser emission timing is controlled so as to provide a synchronization signal at intervals which are equal to the time required for the polygonal mirror rotates through one full turn. In response to the synchronization signal, an image signal is produced. Another alternative is that the sensor 8 for detecting the aforementioned synchronization signal receives the laser beam reflected by the respective polygonal mirror surfaces, and the number of incident beams are counted, wherein an image signal is produced when the same reflecting surface comes in the position.

Then, the possibility of using the other surfaces can be avoided.

To provide the rotational mirror shown in FIG. 1, wherein one cut-away surface is used as a reflecting surface, it is possible to machine the rotational axis itself as shown in FIG. 2. By employing this structure, the number of parts can be reduced, and the accuracy can be increased.

Figure 3:
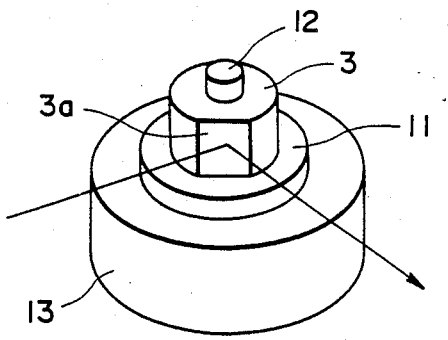

As shown in FIG. 3, a part of a circular column can be cut-away to provide a flat mirror surface. In consideration of the rotational balance, it is possible that it is cut at two parallel surfaces, and one of the cut-away portion is formed into a mirror surface, since then, the rotational balance is improved.

As described in the foregoing, if only one surface is used, the tilting of the reflecting surfaces as in a polygonal mirror wherein the whole polygonal surfaces are used, is not a problem, and the accuracy of mounting the mirror to the motor flange becomes non-influential. In this case, the non-uniform pitch can be prevented without use of the tilt correcting optical system, only if unintentional deflection by vibration is removed.

As described hereinbefore, the portion of the rotor not used for the scanning may have any shape. However, since the rotation of the mirror is high for high speed scanning deflection, a noise is produced by wind pressure, it is preferable that such a portion is circular, further preferably, a circular having a center coincident with the rotational center of the mirror. The surface used for the beam scan may not be a completely flat surface, but may be a reflecting surface having an f-θ correction, by suitably and slightly curved. Therefore, the surface is a substantially flat surface.

Figure 4:
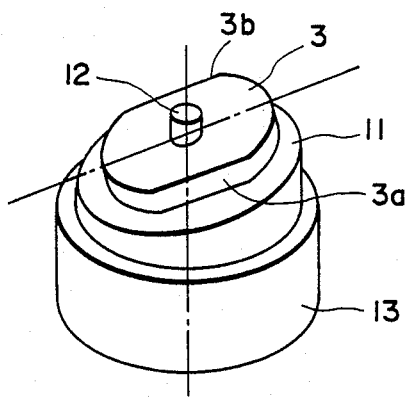
FIGS. 4–8 are perspective views according to other embodiments of the present invention.

Referring to FIG. 4, another embodiment of the present invention will be described, wherein two opposite flat surfaces are used as for the reflecting surfaces for the main scan. That is, a metal cylinder is cut into flat surfaces at diametrically opposed portions. The mirror surfaces are disposed such that when the polygonal mirror mounting flange 11 of the motor is inclined by a seconds, the mirror surfaces 3a and 3b of the mirror 3 are extended along the inclination, that is, the mirror surfaces are parallel with the inclination direction. In other words, when the polygonal mirror mounting flange 11 of the motor is inclined as shown in FIG. 4, the axis of the rotational mirror 3 is inclined; and in such a case the mirror 3 is so positioned that the reflecting surfaces are parallel with a plane including the rotational axis and the axis of the mirror 3. By this structure, the mirror surfaces are parallel with the rotational axis, whereby even if the rotational mirror is tilted, the angle of reflection by each of the opposing mirror surfaces 3a and 3b are substantially equal, so that the pitches are uniform. Thus, similarly to the case of using only one reflecting surface, no particular optical system for the tilt correction is required.

As described above, by simply making the two mirror surfaces parallel to the direction of inclination, the influence of the tilt of the mirror surfaces due to the inclination of the polygonal mirror mounting portion of the motor can be avoided. Therefore, the non-uniform scanning line pitch can be minimized.

As an alternative, a polygonal mirror having three or more reflecting surfaces may be used if only two opposing reflecting surfaces are used by controlling the laser beam emitting timing, with the same advantages.

As will be understood from the foregoing, only the two opposing mirror surfaces are used, and therefore, the accuracy of the polygonal mirror mounting surface of the motor is not influential, and it will suffice only if the two opposing mirror surfaces are made accurate. Therefore, the manufacturing is simple, and the cost of the polygonal mirror can be reduced.

Figure 5:
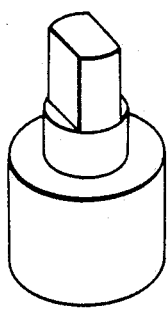

As shown in FIG. 5, the rotational axis itself may be cut-away.

Figure 6:
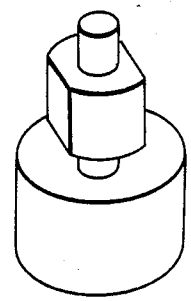

As shown in FIG. 6, a circular column may be cut at two opposite circular portions to provide parallel flat reflecting surfaces.

Figure 7:
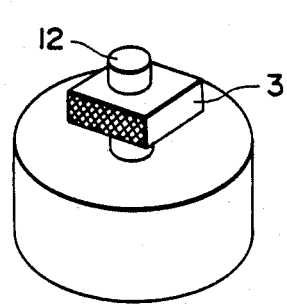
Figure 8:
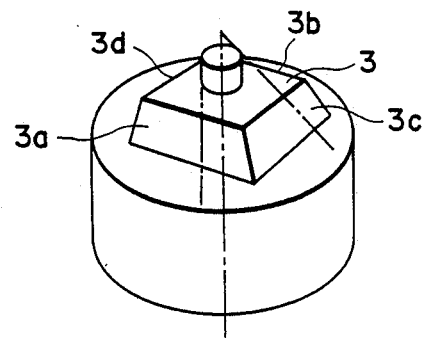

Referring to FIGS. 7 and 8, a further embodiment of the present invention will be described, wherein even if the laser beam is incident on such a portion which is not used for deflecting the beam, the beam does not reach the member to be scanned.

In FIG. 7 embodiment, the portion or portions not used for the scanning have been subjected to an anti-reflection treatment, by for example, coloring it in black. As for another anti-reflection treatment, when a long wavelength range such as a laser beam is used as the scanning beam, an absorption film absorbing such a range of light may be provided.

In FIG. 8 embodiment, the surfaces 3c and 3d not used for the scanning are inclined with respect to the rotational axis so as to prevent the beams reflected thereby from being incident on the member to be scanned.

More particularly, referring to FIG. 10 which is an exemplary arrangement of the device, wherein a scanning optical system is accommodated in a housing, non-use portions 3c and 3b are inclined such that the beam is incident on a position outside the light emitting window of the housing.

Alternatively, in a laser beam printer, a slit may be provided adjacent the photosensitive member, the non-use portions 3c and 3d are so inclined that the beam is blocked by the slit member.

According to those embodiments, the influence of tilting resulting from inclination of the mounting of the rotational mirror can be substantially neglected.

Figure 9:
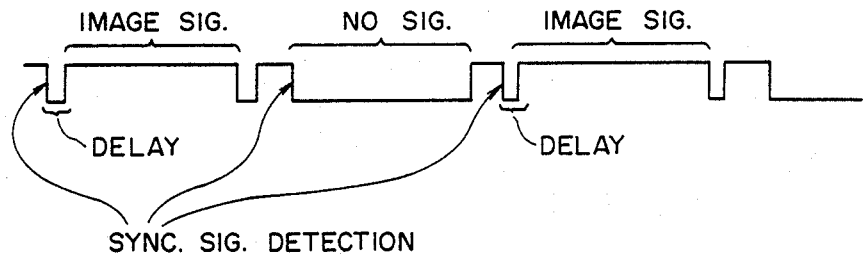
FIG. 9 is a timing chart for an embodiment of the present invention.

Referring to FIG. 9, operational timing will be described in an exemplary laser beam printer shown in FIG. 10 incorporating the present invention. FIG. 9 is a time chart of the control of image signals.

As shown in FIG. 9, the rotational mirror has four sides, wherein the photosensitive drum 5 rotates in a direction indicated by an arrow C. A scanning beam is reflected by a first surface 3a of the polygonal mirror 3 and is received by a photosensor 8, upon which it produces a synchronization signal. With a predetermined delay of time, an image signal is outputted. Then, the beam modulated in accordance with the image signal scans the photosensitive drum by the main scanning mirror surface 3a. After this first scan is completed, the second beam is scanningly deflected by the second surface 3c. Similarly to the first beam, the photosensor 8 produces a beam detection signal, but at this time, after the predetermined delay of time, no-signal is produced, and therefore, the laser beam from the laser source 2 is not modulated, so that no recording is effected on the photosensitive drum. Next, when the third surface 3b which is the opposite surface of the first surface 3a receives the beam, and the beam detection signal is produced in the photosensor 8, an image signal is produced with a predetermined delay of time.

Thus, even when a square column is used, the non-uniform pitch due to the tilt can be minimized or reduced, by producing the image signals in the beam only when it is directed to the opposite two surfaces.

Accordingly, with the two opposite surfaces which are precise in parallelism and which are only used for scanning the surfaces to be scanned, the problem of tilt is solved or minimized, and the scanning speed is doubled, as compared with the case where only one surface is used for the beam deflection. If, however, the flange for mounting the rotational mirror is inclined, the two reflecting surfaces used for the scanning are preferably made parallel with the direction of inclination, that is, parallel with a plane including the correct axis and inclined axis.

Further embodiments will be described, wherein only two opposite surfaces are used for scanningly deflecting the beam to scan the member to be scanned, and wherein a rotational mirror and the flange for mounting the rotational mirror are mounted at correct positions without difficulty.

Figures 12, 13:
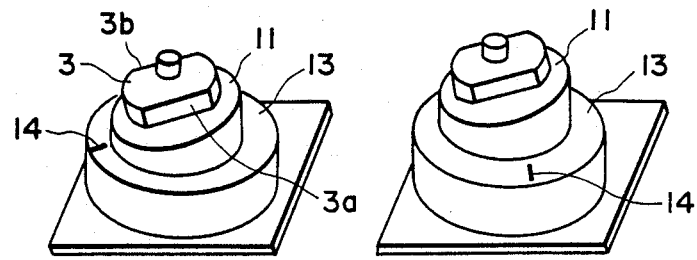
FIGS. 12 and 13 are perspective views of beam deflectors according to other embodiments of the present invention.

Referring to FIG. 12, a deflection of a top surface, for example, of the mirror mounting flange 11 when the flange 11 rotates, is measured. An index 14 is marked at least one of two ends of the deflection. The center between the two mirror surfaces of the rotational mirror 2d is aligned with the index 14, and the rotational mirror 14 is mounted there.

Referring to FIG. 13, an index 14 is marked between the two points corresponding to the ends of the deflection, and the center of one of the mirror surfaces is aligned with the index 14, and the rotational mirror is mounted there.

With one of these indexes, the two mirror surfaces are made correctly parallel to the inclination simply by aligning the rotational mirror with the index. In this manner, the influence of the rotating surface deflection due to the tilt of the mounting of the rotational mirror to the motor can be minimized.

Further, those indexes are used for rough alignment in the mounting, and after the rotational mirror is once mounted, the rotational mirror 3 may be displaced for fine adjustment relative to the mirror mounting portion 11 so as to minimize the tilt of the rotating surface on the basis of actual measurement of the tilting of the rotational mirror surface. In this case, since the rotational mirror has already been so positioned that the tilting is very small, the fine adjustment is easy.

In the foregoing embodiments, the indexes are marked on the rotor, but this is not limiting, and it may be marked on the other portion, if it rotates as a unit with the rotational mirror such as the flange.

The number of indexes are not limited to one, and plural indexes may be marked. For example, they may be marked at two positions corresponding to the ends of the deflection, whereby the mounting accuracy is further increased.

Also, the rotational mirror may be provided with an index, which is to be aligned with the index of the mounting portion, whereby the mounting accuracy is further increased. In addition, the index is not limited to a visible one but may be optical ones having different reflective index or electrical one having different electric resistance.

In the case that only a part of the side surface of the rotational mirror is used for scanningly deflecting the beam, it is preferable that when the beam is incident on the non-use portion of the rotational mirror as shown in FIGS. 7 and 8, the beam reflected by the non-use portion does not reach the surface to be scanned such as the photosensitive member. Further embodiments of the present invention will be described wherein even when the beam is incident on the non-use portion, the beam reflected thereby is prevented from scanning the member to be scanned with a simple structure.

Figure 14:
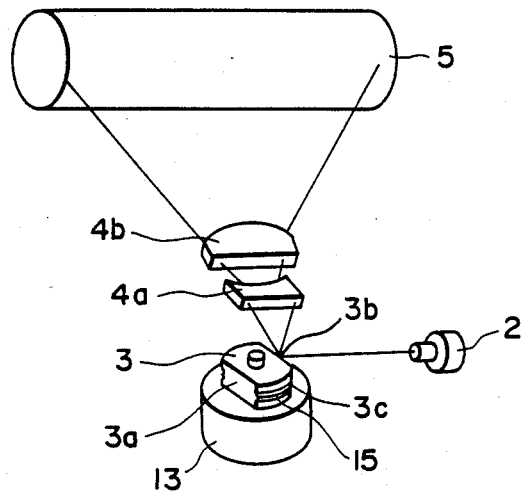
FIG. 14 shows a laser beam printer according to another embodiment of the present invention.

Referring to FIG. 14, there is shown a part of a laser beam printer incorporating one of the embodiments, wherein circumferential grooves 15 are formed in the portions receiving the light beam in the non-use surfaces 3c and 3d which are not mirror surfaces. Each of the grooves 15 has a cross-section in a circular form or V form, preferably.

As shown in FIG. 15, by forming it into a partial circle, the beam can be expanded to reduce the energy per unit area. However, it is possible that when the beam is incident on the exact center A of the circle, a slight amount of reflected light reaches a photosensitive member. Although the amount is so small that the photosensitive member is effectively exposed, it might be a problem if the sensitivity of the photosensitive member is very high or if the intensity of the beam is very strong.

Referring to FIG. 16, there is shown a further preferable embodiment having a V-shaped groove.

The beam 16 incident on the inclined surface portion of the V-shaped groove is reflected to outside the scanning position, and the beam incident on the center of the V-shaped groove is divided into beams 17 and 18, which are both directed outside the scanning position.

Thus, by aligning the center of the beam with the center of the V-shaped groove, the beam reflected thereby can be directed to outside the photosensitive drum surface, and also, even if the position of incident beam onto the rotational mirror is slightly deviated, the beam reaches the inclined surface portion, so that the beam is reflected to a position different from the position to be scanned. The V-shape is preferably symmetrical, since then the depth of the groove can be minimized so that the groove extending to the longitudinal ends, i.e., adjacent reflecting or deflecting surfaces where the groove reduces the effective reflecting surfaces by its cross-section, reduces only a minimum amount of the effective reflecting area in the adjacent reflecting surfaces. However, the V-shape may be asymmetrical, for example, one side is inclined with respect to the rotational axis, while the other is perpendicular thereto. In this case, the arrangement is such that the beam is incident on the inclined side. This groove is less advantageous than the symmetric groove in that the effective reflecting surfaces are reduced by a larger amount. However, it is possible to design inconsideration of this point.

The sides of the V-shape may be curved, if the central edge is pointed.

If it is difficult to sharply point the bottom of the V-shape, an anti-reflection coating may be applied to the bottom.

In this embodiment, the grooves are preferably perpendicular to the rotational axis, since then the width and depth thereof may be made smaller.

It is preferable that the groove is formed in the middle between the top and bottom surfaces of the rotational mirror.

The non-use portions may be of flat surfaces, but more preferably, it is in the form of a part-circle concentric with the rotational axis. By doing so, the manufacturing is easy, and the air resistance during rotation can be minimized, whereby the noise is minimized, and the motor load is minimized.

The number of the grooves is not limited to one, but may be plural, as shown in FIG. 17. By doing so, the depth of the groove can be reduced.

Also, it is preferable that an angle of the reflecting surface and an angle of the non-use surface, particularly, the angles of the flat surfaces 3a and 3b and the angles of the part-circular surfaces 3c and 3d with respect to the bottom surface of the rotational mirror are the same, particularly 90 degrees. By doing so, the accuracy of the angle of the rotational mirror with respect to a reference mounting surface can be easily achieved when the reflecting surfaces are formed into mirror surfaces.

The arrangement of the reflecting surfaces and non-use surfaces are not limited to those shown in FIG. 14. Only one surface may be used, and three or more surfaces are used.

The rotational mirror for deflecting the beam has a reflecting surace or surfaces for deflecting the beam, which has to be maintained at a uniform and high reflecting condition, and therefore, it should be handled with great care. Further embodiments will be described wherein this problem has been solved.

Referring to FIG. 18, there is shown a rotational mirror in a perspective view according to the embodiment. The rotational mirror is provided with through holes 3e and 3f adjacent the non-use surfaces at such positions symmetrical with respect to the rotational axis. The holes have substantially the same size, and are diametrically opposed, that is, they are circumferential away by 180 degrees about the parallel with the deflecting surfaces 3c and 3d. Therefore, the dynamic balance is maintained. Those holes 3e and 3f are away from the light deflecting surfaces 3a and 3b which are accurately formed, so that even if a small or relatively large force is applied to the holes, no influence is given to the mirror surfaces 3a and 3b.

By handling the rotational mirror using those through holes, the possibility is minimized that the beam deflecting surfaces 3c and 3d are damaged, or contaminated with oily matter.

It is not always necessary that the holes are through holes, but through holes are advantageous in the following. It is possible to skewer plural rotational mirrors to machine or to coat them, so that plural rotational mirrors are processed simultaneously. Therefore, the manufacturing cost may be reduced, and the variations in the manufacturing accuracy can be minimized.

Thus, by the provision of the working holes, preferably through holes, the possibility of the damage to the reflecting surfaces can be prevented.

In this embodiment, the line connecting the two holes 3e and 3f is parallel to the reflecting surfaces 3a and 3b, and therefore, a relatively strong stress resulting from the tools working on the holes 3e and 3f does not deform the reflecting surfaces 3a and 3b.

Further, since the line connecting the holes 3e and 3f is in the middle between the reflecting surfaces 3a and 3b, the above described liabilities are further minimized.

Referring to FIG. 19, there is shown a rotational mirror having a reference surface for mounting the rotational mirror to the driving motor. The reference surface 3g is circular substantially tangential to the reflecting surfaces 3a and 3b of the rotational mirror, or smaller. It should be noted that the working holes are formed outside the mounting reference surface. By doing so, some strain resulting from formation of the working holes does not influence the reference surface, so as to maintain the flatness of the reference surface with certainty. Also, the flash resulting from machining the holes does not adversely affect the reference surface.

The reference surface may be formed on the rotor in place of the rotational mirror.

As described hereinbefore, the non-use portions are preferable in the form of a part-circular. When, however, the reflecting surfaces 3a and 3b are made larger, the angle (of contact at the boundaries) between the reflecting surfaces 3a and 3b and the non-use surfaces 3c and 3d become smaller, which is liable to produce turbulence.

In the embodiments of FIGS. 18 and 19, this problem is minimized, which is particularly significant when a large reflecting surface or reflecting surfaces are formed with a small size rotational mirror.

More particularly, the non-use portion has a small radius of curvature adjacent the reflecting surfaces 3a and 3b, and it becomes larger away from the reflecting surfaces. Further preferably, the radius of curvature continuously changed from light reflecting surface to the non-use surface.

With this structure, the production of turbulence at the boundaries between the reflecting surfaces and the non-use surfaces can be reduced or removed.

While the invention has been described with reference to the structures disclosed herein, it is not confined to the details set forth and this application is intended to cover such modifications or changes as may come within the purposes of the improvements or the scope of the following claims.

What is claimed is:

1. A laser beam printer, comprising:
    a photosensitive member;
    a beam generating station for providing a laser beam modulated in accordance with image information;
    a rotational mirror for reflecting the laser beam, said rotational mirror having one side surface effective to reflect the beam, said one side surface extending substantially parallel with a rotation axis of said rotational mirror, wherein only the one side surface is used for scanningly deflecting the beam to scan said photosensitive member, the laser beam being substantially perpendicularly incident on said one side surface; and
    driving means for rotating said rotational mirror in one direction to scanningly deflect the beam.

2. A printer according to claim 1, wherein said rotational mirror has a non-use side portion which is not effective to scanningly deflect the beam, and wherein the reflecting surface is substantially flat, whereas the non-use portion is arcuated.

3. A printer according to claim 2, wherein the light beam output is stopped at the non-use portion of the rotational mirror.

4. A printer according to claim 2, wherein when the light beam is incident on the non-use portion, the beam is not reflected to said photosensitive member.

5. A printer according to claim 4, wherein said non-use portion is anti-treated.

6. A printer according to claim 4, wherein the non-use portion is inclined at a different angle from that of the reflecting surface so as not to scan said photosensitive member with the light beam.

* * * * *

UNITED STATES PATENT AND TRADEMARK OFFICE
CERTIFICATE OF CORRECTION

PATENT NO. : 4,915,465
DATED : April 10, 1990
INVENTOR(S) : YOSHINORI SUGIURA It is certified that error appears in the above-identified patent and that said Letters Patent is hereby corrected as shown below:

ON THE TITLE PAGE,
IN [30] FOREIGN APPLICATION PRIORITY DATA

"62-101356" should read --[U] 62-101356--.

COLUMN 2

Line 24, "can has" should read --can be--.

COLUMN 3

Line 43, "o" should read --of--.
Line 66, "rotates" should read --to rotate--.

COLUMN 4

Line 5, "in" should read --to--.
Line 18, "portion" should read --portions--.
Line 37, "by" should be deleted.

COLUMN 6

Line 10, "surfaces" should read --surface--.

COLUMN 8

Line 26, "are" should read --may be--.
Line 40, "the parallel" should read --the rotational axis. The holes 3e and 3f are formed parallel--.

UNITED STATES PATENT AND TRADEMARK OFFICE
CERTIFICATE OF CORRECTION

PATENT NO. : 4,915,465

DATED : April 10, 1990

INVENTOR(S) : YOSHINORI SUGIURA

It is certified that error appears in the above-identified patent and that said Letters Patent is hereby corrected as shown below:

COLUMN 10

Line 18, "for rotating" should read --for continuously rotating--.

Signed and Sealed this

Fifth Day of May, 1992

Attest:

DOUGLAS B. COMER

Attesting Officer

Acting Commissioner of Patents and Trademarks